United States Patent
Frolov et al.

(10) Patent No.: US 6,865,018 B2
(45) Date of Patent: Mar. 8, 2005

(54) MULTISTAGE OPTICAL AMPLIFIER HAVING A FIBER-BASED AMPLIFIER STAGE AND A PLANAR WAVEGUIDE-BASED AMPLIFIER STAGE

(75) Inventors: Sergey Frolov, Berkeley Heights, NJ (US); Joseph Shmulovich, New Providence, NJ (US); Allan James Bruce, Scotch Plains, NJ (US); Tek-Ming Shen, Westfield, NJ (US)

(73) Assignee: Inplane Photonics, Inc., South Plainfield, NJ (US)

( * ) Notice: Subject to any disclaimer, the term of this patent is extended or adjusted under 35 U.S.C. 154(b) by 0 days.

(21) Appl. No.: 10/280,641

(22) Filed: Oct. 25, 2002

(65) Prior Publication Data

US 2003/0165007 A1 Sep. 4, 2003

Related U.S. Application Data

(60) Provisional application No. 60/361,895, filed on Mar. 4, 2002.

(51) Int. Cl.[7] ................................................. H01S 3/00
(52) U.S. Cl. ............................... 359/337.4; 359/341.1; 359/342
(58) Field of Search ............................. 359/337.4, 333, 359/341.1, 342

(56) References Cited

U.S. PATENT DOCUMENTS

| | | | | |
|---|---|---|---|---|
| 5,115,338 A | | 5/1992 | DiGiovanni et al. | 359/337 |
| 5,253,104 A | | 10/1993 | Delavaux | 359/341 |
| 5,430,572 A | | 7/1995 | DiGiovanni et al. | 359/341 |
| 5,521,753 A | | 5/1996 | Fake et al. | 359/341 |
| 6,359,725 B1 | | 3/2002 | Islam | 359/334 |
| 6,384,961 B2 | * | 5/2002 | Lawrence | 359/333 |
| 6,490,077 B1 | * | 12/2002 | Conradi | 359/334 |
| 6,577,437 B2 | * | 6/2003 | Sugaya et al. | 359/334 |
| 6,580,549 B1 | * | 6/2003 | Kinoshita | 359/337 |

* cited by examiner

*Primary Examiner*—Mark Hellner
(74) *Attorney, Agent, or Firm*—Mayer Fortkort & Williams, PC; Stuart H. Mayer, Esq.

(57) ABSTRACT

A multistage optical amplifier includes a fiber amplifier stage having an active optical fiber for imparting gain to an optical signal propagating therethrough and a coupler supplying pump energy to the optical fiber. A planar waveguide amplifier stage is optically coupled to the fiber amplifier stage. The waveguide amplifier including a substrate, an active planar waveguide formed on the substrate for imparting gain to an optical signal propagating therethrough, and at least one waveguide coupler formed on the substrate for coupling pump power to the active planar waveguide.

45 Claims, 3 Drawing Sheets ly to optical amplifiers for lightwave communication systems and, more particularly, to a multistage optical amplifier that include a fiber-based amplifier stage and a planar waveguide-based amplifier stage.

MULTISTAGE OPTICAL AMPLIFIER HAVING A FIBER-BASED AMPLIFIER STAGE AND A PLANAR WAVEGUIDE-BASED AMPLIFIER STAGE

STATEMENT OF RELATED APPLICATION

This application claims the benefit of priority to U.S. Provisional Patent Application 60/361,895, filed Mar. 4, 2002, entitled "Hybrid Erbium-Doped Fiber Amplifier With Erbium-Doped Waveguide Amplifier."

FIELD OF THE INVENTION

The present invention relates generally to optical amplifiers for lightwave communication systems and, more particularly, to a multistage optical amplifier that include a fiber-based amplifier stage and a planar waveguide-based amplifier stage.

BACKGROUND OF THE INVENTION

Optical amplifiers such as erbium-doped fiber amplifiers (EDFAs) have been used as power amplifiers, repeaters and preamplifiers in lightwave systems and have been responsible for significant improvement in the performance of long-distance transmission systems, networks, CATV distribution and the like. A number of types of optical amplifiers have been developed. One class of optical amplifiers is rare-earth doped optical amplifiers, which use rare-earth ions as the active element. The ions are doped in the fiber core and pumped optically to provide gain. The silica core serves as the host medium for the ions. While many different rare-earth ions such as neodymium, praseodymium, ytterbium etc. can be used to provide gain in different portions of the spectrum, erbium-doped optical amplifiers have proven to be particularly attractive because they are operable in the spectral region where optical loss in the silica core is minimal. Also, the erbium-doped optical amplifier is particularly useful because of its ability to amplify multiple wavelength channels without crosstalk penalty, even when operating deep in gain compression. Important features of these amplifiers include high gain, low noise (near quantum limit) and high saturated output power.

Optical amplifiers are designed by considering a number of parameters including gain, output power, compression (i.e. gain saturation), and noise performance. Noise performance is typically measured by the noise figure, which is defined as the signal-to-noise ratio at the input of the optical amplifier divided by that at the output. When optical amplifiers are used as repeaters, they should operate with very low noise figure and high output power in order to maximize the distance between adjacent repeaters in the lightwave system.

Initially, optical systems utilized relatively simple single-stage amplifiers in combination with ancillary passive components such as isolators, pump multiplexers, and power monitors, which are attached to either end of the fiber amplifier. It has been found, however, that this arrangement not only leads to rather stringent design and fabrication tolerances for a high-performance optical amplifier, but it prevents the full exploitation of erbium-doped fiber amplifiers.

Optical amplifier arrangements are known which use multiple EDFA stages to improve the performance characteristics of the optical amplifier. In such an arrangement, two or more separate stages of amplification are separated by passive optical components. FIG. 1 shows an example of a known two stage optical amplifier. The first stage of amplification 12 is coupled to a second stage of amplification 14 through a passive, optically lossy element 16 such as an isolator or attenuator. The first stage 12 includes an erbium doped amplifying fiber 18 coupled via a coupler 20 to both an input port 22 for receiving a signal that is to be amplified and to a pump port 24 for receiving energy from a laser diode pump 26. The second stage 14 of the multistage amplifier includes a second erbium doped amplifying fiber 14 coupled via a coupler 28 to both an output port 30 for providing a signal which has been amplified and to a pump port 32 for receiving energy from a laser diode pump 34.

The output port 36 of doped fiber 18 is coupled to the input port 38 of doped fiber 19 via the passive, optically lossy optical element 16. The optical element 16 is generally coupled to the optical fibers of the first stage 12 and the second stage 14 by fusion, by splicing or by other means. The coupler 20 is constructed to couple both the input signal received by input port 22 and the pump signal received by pump port 24 to doped fiber 18. In a similar manner, coupler 28 is constructed to pass the amplified signal from the multistage amplifier to the output port 30 and to couple the pump signal received by pump port 32 to amplifying fiber 14.

In order to achieve an optical amplifier with a low noise figure and a high output power, the first stage of amplification 12 is generally optimized to provide a low noise figure at all wavelengths and low to moderate output power. The second stage of amplification 14 is generally optimized to provide high output power and efficiency at the expense of an increased noise figure. If more than two amplification stages are employed, the intermediate stages are generally optimized to provide an intermediate noise figure and an intermediate level of output power.

One problem with an optical amplifier that comprises multistage EDFAs is that because they employ a multitude of components they can be difficult to assemble and require a large number of splices that contribute to loss that reduces the overall gain supplied by the amplifier. Moreover, as the number of stages increase, the amount of space the amplifier occupies can be come unduly large. Accordingly, it would be desirable to provide a multistage optical amplifier that overcomes the aforementioned deficiencies.

SUMMARY OF THE INVENTION

In accordance with the present invention, a multistage optical amplifier is provided. The amplifier includes a fiber amplifier stage having an active optical fiber for imparting gain to an optical signal propagating therethrough and a coupler supplying pump energy to the optical fiber. A planar waveguide amplifier stage is optically coupled to the fiber amplifier stage. The waveguide amplifier including a substrate, an active planar waveguide formed on the substrate for imparting gain to an optical signal propagating therethrough, and at least one waveguide coupler formed on the substrate for coupling pump power to the active planar waveguide.

In accordance with another aspect of the invention, a second fiber amplifier stage is provided that includes a second active optical fiber for imparting gain to an optical signal propagating therethrough and a second coupler supplying pump energy to the optical fiber.

In accordance with another aspect of the invention, the fiber amplifier stage has an output coupled to an input of the planar waveguide amplifier stage and the waveguide amplifier stage has an output coupled to an input of the second fiber amplifier stage.

In accordance with another aspect of the invention, the fiber amplifier stage is a rare-earth amplifier stage and the active optical fiber is doped with a rare-earth element.

In accordance with another aspect of the invention, the rare-earth element is erbium.

DETAILED DESCRIPTION

The present inventor has recognized that a multistage optical amplifier can be formed from one or more stages of an EDFA (or other rare-earth doped fiber amplifier) that is combined with one or more stages of a rare-earth doped optical amplifier that is not an EDFA, but rather which is a planar waveguide optical amplifier. In contrast to fiber amplifiers, which are optical glass fibers having cores doped with the optically active element, waveguide amplifiers are planar waveguides fabricated on suitable substrates such as silicon. The planar waveguide amplifiers include cores doped with an optically active element such as a rare-earth element.

Fiber amplifiers have traditionally been favored over waveguide amplifiers in most applications because waveguide amplifiers are typically much shorter, requiring a correspondingly higher level of doping to achieve the necessary gain of fiber amplifiers. Higher levels of doping adversely affect the efficiency of the amplifier. However, waveguide amplifiers are easier to manufacture than fiber amplifiers because large numbers of them can be fabricated on a single wafer and integrated on the same chip with other components, making the whole unit less expensive. Therefore, in applications requiring relatively small components, device integration and ease of packaging, it is advantageous to use waveguide amplifiers.

Figure 1:
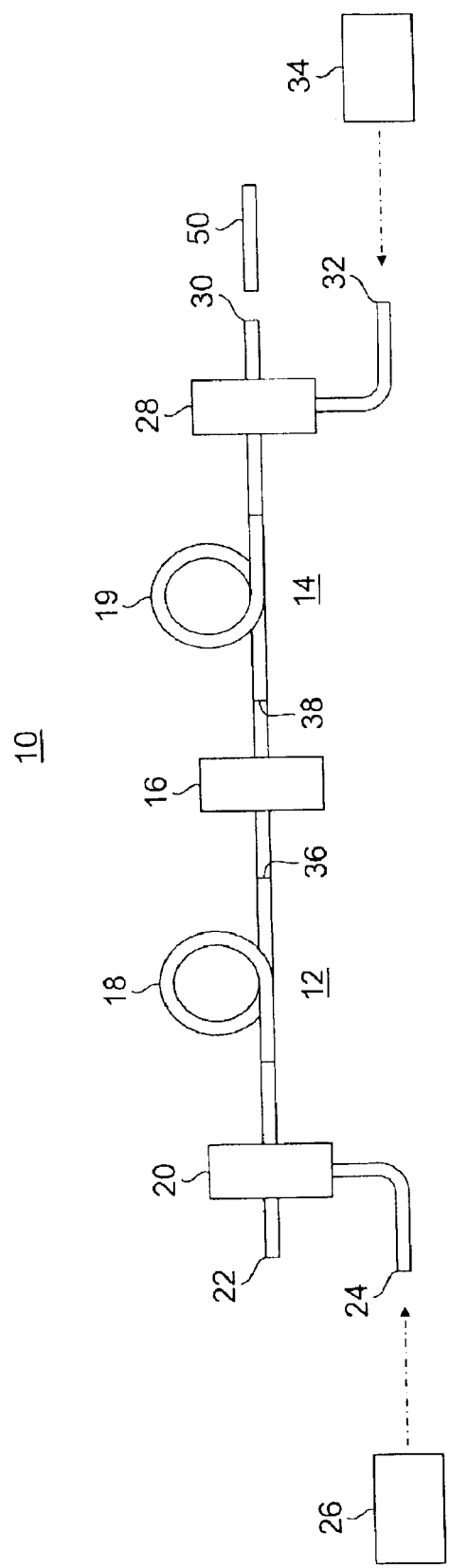
FIG. 1 shows a known two stage optical amplifier.

When multistage amplifiers have been required, they have typically been formed from either multiple stages of fiber amplifiers of the type depicted in FIG. 1 or multiple stages of waveguide amplifiers. In contrast, the present invention provides a hybrid multistage amplifier in which at least one stage is a rare-earth doped fiber amplifier such an EDFA and at least another stage is a rare-earth doped waveguide amplifier.

The inventive hybrid multistage amplifier has a number of advantages in comparison to conventional multistage all fiber amplifiers. For example, because waveguide amplifiers can be made extremely small, the overall size of the multistage amplifier can be minimized. Moreover, because waveguide amplifiers allow for device integration, the passive optical elements (e.g., optical element 16 shown in FIG. 1) can be integrated on the same substrate as the waveguide amplifier, thereby reducing the number of individual components that the multistage amplifier requires. Additionally, the inventive hybrid amplifier may also be advantageous in comparison to a multi-stage amplifier that employs only waveguide amplifiers. In particular, the hybrid device may achieve power and noise figure performance that is comparable to a multistage all fiber amplifier. In contrast, a multistage amplifier that employs only waveguide amplifier stages will generally yield inferior performance.

Figure 2:
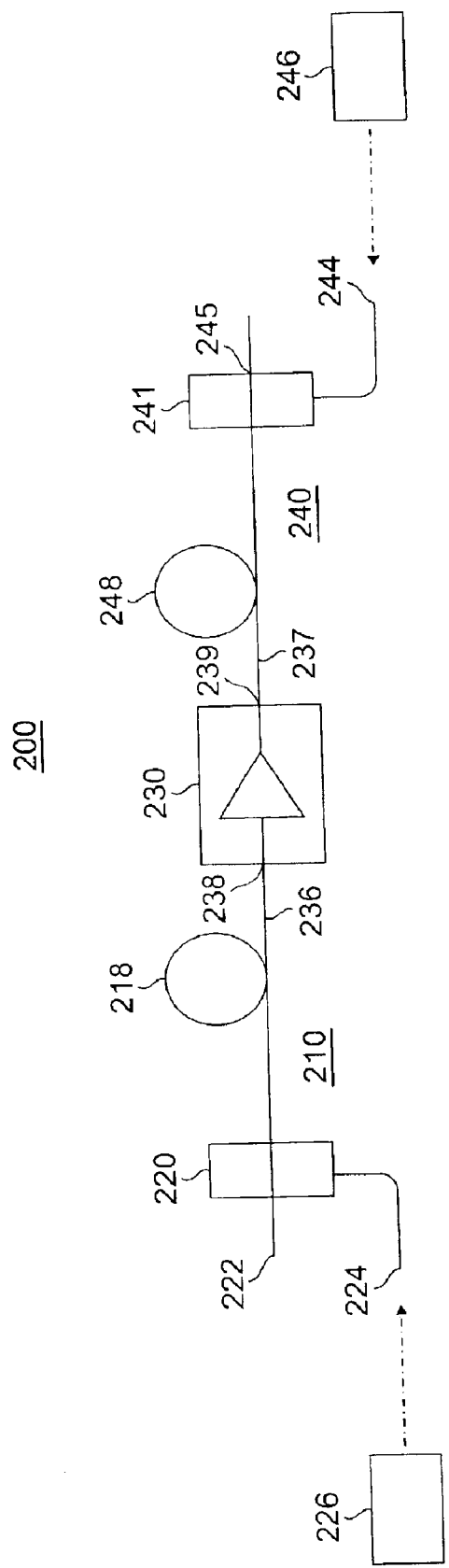
FIG. 2 shows one embodiment of a hybrid multistage optical amplifier constructed in accordance with the present invention.

FIG. 2 shows one embodiment of a hybrid multistage optical amplifier 200 constructed in accordance with the present invention. For purposes of illustration only and not as a limitation on the invention, the optical amplifier 200 is depicted as a three stage amplifier in which the first and third stages 210 and 240 are rare-earth doped fiber amplifiers and the second or middle stage 230 is a waveguide amplifier. As shown, the first stage 210 includes a rare-earth doped fiber 218 coupled via a coupler 220 to both an input port 222 for receiving a signal that is to be amplified and to a pump port 224 for receiving energy from a pump source 226. Likewise, the third stage 240 of the hybrid multistage optical amplifier 200 includes a rare-earth doped fiber 248 coupled via a coupler 241 to both an output port 245 for providing a signal that has been amplified and to a pump port 244 for receiving energy from a pump source 246. The output port 236 of doped fiber 218 is coupled to the input port 238 of the second stage 230 of the hybrid multistage optical amplifier 200. The output port 239 of the second stage 230 is coupled to the input port 237 of the second doped amplifying fiber 248.

Couplers 220 and 241 may be any components that can convey the optical pump energy from a pump source to the doped fibers and may include, for example, directional couplers, or MMIs. The couplers 220 and 241 are configured to strongly couple optical energy at the pump wavelength and weakly couple optical energy at the signal wavelength. Suitable pump sources 246 include laser diodes, solid state lasers and the like.

Figure 3:
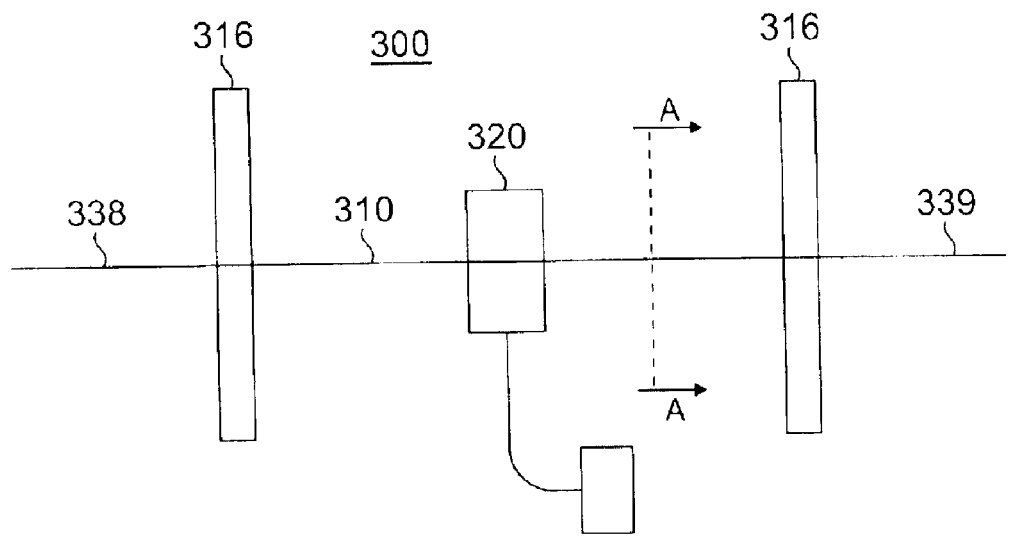
FIG. 3 shows the waveguide optical amplifier that forms the second stage of the hybrid optical amplifier depicted in FIG. 2.

FIG. 3 shows the waveguide optical amplifier 300 that forms the second stage 230 of the hybrid optical amplifier 200 depicted in FIG. 2. Waveguide optical amplifier 300 includes a planar doped waveguide 310 in which the optical signal received from the first stage 210 of the hybrid amplifier propagates. Planar waveguide 310 may be a single or multimode waveguide and is doped with an active element such as a rare-earth element, e.g., erbium. The waveguide 310 includes input port 338 and output port 339, which respectively correspond to the input port 238 and output port 239 shown in FIG. 2. The waveguide optical amplifier 300 also includes a coupling element 320 for coupling optical pump energy to waveguide 310. Coupling element 320 may be any integrated component that can convey the optical pump energy from a pump source to the waveguide 310 and may include, for example, directional couplers, or MMIs. Coupling element 320 is configured to strongly couple optical energy at the pump wavelength and weakly couple optical energy at the signal wavelength. Waveguide optical amplifier 300 also includes one or more passive, optically lossy optical elements 316.

Lossy optical element(s) 316 can be selected from a wide variety of components that are used to perform desired optical functions. For example, optical element 316 may be an optical isolator that allows the signal to travel in one direction but not another, a wavelength division multiplexer (WDM) that combines the pump and signal energy into a single waveguide, or an optical tap that couples a small portion of the signal energy out of the waveguide to a detector monitoring performance. Optical element 316 may also be a variable optical attenuator (VOA) that produces a controllable wavelength-independent loss, a dispersion compensation module for reducing chromatic dispersion, or a gain flattening filter that is used to make the gain of the amplifier wavelength-independent. Of course, optical element 316 is not limited to the previously enumerated components but rather may be any component that is integrated with the waveguide 310 and through which the signal passes. Optical element(s) 316 may be situated at any point along waveguide 310.

Figure 4:
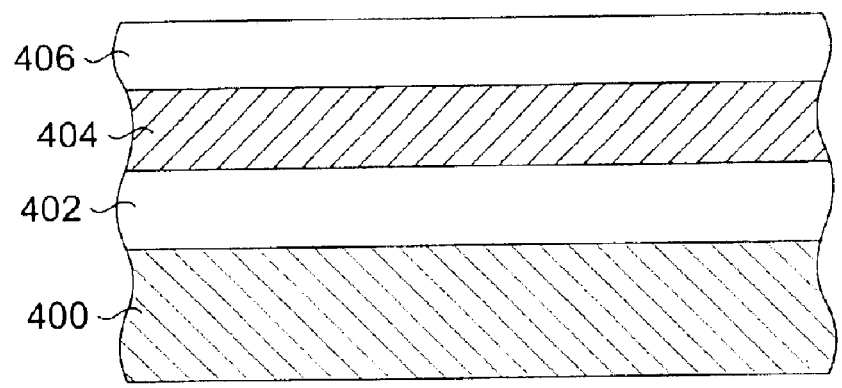
FIG. 4 shows a cross-section through the planar waveguide of FIG. 3 taken along line A—A.

FIG. 4 shows a cross-section through planar waveguide 310 taken along line A—A in FIG. 3. As shown, planar waveguide 310 includes substrate 400, lower cladding layer 402, core layer 404, and upper cladding layer 406. Core layer 404 has an index of refraction greater than the index of refraction of lower and upper cladding layers 402 and 406 so that the optical energy is substantially confined to the core layer 404. Core layer 404 is doped with an active element such as a rare-earth element (e.g., erbium).

Waveguide 310 and coupling element 320 may be fabricated in a variety of different ways from a variety of different materials. For example, silicon technology is often employed to form multi-component glass waveguides or waveguide circuits. Doped-silica waveguides are usually preferred because they have a number of attractive properties including low cost, low loss, stability, and compatibility for coupling to laser diodes, other waveguides, high NA fiber and standard fiber. Such a waveguide is fabricated on a carrier substrate, which typically comprises silicon or silica. The substrate serves as a mechanical support for the otherwise fragile waveguide and it can, if desired, also play the role of the bottom portion of the cladding. In addition, it can serve as a fixture to which input and output fibers are attached so as to optically couple cores of an input/output fiber to the cores of the waveguide.

The fabrication process begins by depositing a base or lower cladding layer of low index silica on the carrier substrate (assuming the substrate itself is not used as the cladding layer). A layer of doped glass with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. The difference in refractive index between the core and cladding layers of the waveguide is mostly determined by the material system and the fabrication process. In practice, different waveguide structures and systems are used for different types of functions and trade-offs are made in the core dimensions and the refractive index difference to optimize different aspects of optical performance.

Those of ordinary skill in the art will recognize that the present invention is not limited to silica-based waveguides. More generally, the invention encompasses hybrid optical amplifiers in which the waveguides employed in the planar waveguide amplifier stage is based on other optically guiding structures such as other multi-component glasses or polymeric materials. For example, other glass compositions that may be used include oxides of germanium, phosphorus, and boron as well as combinations thereof. In addition, the glass compositions that are employed may include one or more modifiers (e.g., alkali and alkaline elements) as well as a variety of different active elements. Moreover, the present invention also encompasses planar waveguides that have a different structure and geometry from that shown in FIG. 4. For example, core layer 204 may comprise a passive layer in addition to the active layer seen in FIG. 4.

The fiber amplifier stages 210 and 240 depicted in FIG. 2 are generally rare-earth doped optical amplifiers, which use rare-earth ions as the active element. The ions are doped in the fiber core and pumped optically to provide gain. The fiber core that serves as the host medium for the ions is typically a silica-based material. For example, the host medium may be silica that is doped with one or more dopants such as aluminum, germanium, and phosphorus. Other dopants that are sometimes employed include fluoride, tellurites, and phosphates. The host medium may also be based on a material other than silica, such as germanium, for example. While many different rare-earth ions such as neodymium, praseodymium, ytterbium etc. can be used to provide gain in different portions of the spectrum, erbium-doped fiber amplifiers (EDFAs) have proven to be particularly attractive because they are operable in the spectral region where optical loss in the fiber is minimal. Also, the erbium-doped fiber amplifier is particularly useful because of its ability to amplify multiple wavelength channels without crosstalk penalty, even when operating deep in gain compression. Of course, the present invention is not limited to any of the aforementioned fiber amplifiers, but more generally may encompass any fiber amplifier regardless of the composition of the host medium or the active element.

In some embodiments of the invention the pump source or sources may be waveguide lasers that are directly integrated on the same substrate as the waveguide optical amplifier. This is particularly advantageous because all the active and passive elements of the waveguide optical amplifier can be conveniently located on a single chip. The pump source or sources may be single mode or multimode sources of optical energy.

While waveguide optical amplifier 230 is depicted as the middle stage in the three stage hybrid amplifier shown in FIG. 2, the waveguide optical amplifier 230 more generally may be used for any of the amplifier stages. However, the characteristics of the waveguide optical amplifier make it particularly suitable for the middle stage of the hybrid amplifier because waveguide optical amplifiers typically produce a higher noise figure and a lower power efficiency than their corresponding fiber amplifiers.

In the present invention the fiber amplifier stage may be optically coupled to the waveguide amplifier stage by a variety of different methods. For instance, the waveguide amplifier stage(s) can be configured so that the mode field at the edge of the waveguide matches the mode field of the adjacent optical fiber amplifier stage. In this way the optical fiber can be attached to the waveguide by optimizing the alignment of the guides for maximum coupling efficiency, after which the fiber can be attached to the waveguide structure by any suitable mechanical means including glue, screws, complex mechanical structures or even glass fusion in appropriate cases. Alternatively, the waveguide amplifier stage and the fiber amplifier stage may be optically coupled via free-space optical structures, whereby the light exiting the fiber is passed through lenses, mirrors, prisms or other suitable optical components in order to optimize coupling into the mode of the waveguide. Proper design and alignment of such a coupling scheme can advantageously provide good coupling between fiber and waveguide amplifier stages that have dissimilar mode structures.

As is well-known in the art, optical amplification within a doped amplifier occurs at predetermined signal wavelengths (for example, $\lambda_s$=1550 nm) in the presence of pump signals at certain wavelengths (for example, if erbium is employed as the active element, $\lambda_p$=980 nm or 1480 nm). Accordingly, if the fiber amplifier stage and the waveguide amplifier stage both employ erbium as the active element the pump energy received by their respective coupling elements may be all at the same wavelength (e.g., $\lambda_{p1}=\lambda_{p2}=\lambda_{p3}$ . . .

=$\lambda_{pn}$=980 nm). In general, however, different coupling elements may receive different pump energies. In fact, since each pump wavelength offers different benefits, each may be used to form an optical amplifier stage which exhibits attributes of the different pump wavelengths. For example, referring again to a hybrid amplifier in which the active element is erbium, a pump wavelength of 980 nm may be used for either the fiber amplifier stage or the planar waveguide amplifier stage and a pump wavelength of 1480 nm may be used for the other amplifier stage. Using a 980 nm pump signal is known to provide relative high gain with relative low noise—ideal conditions for a pre-amplifier application. A pump wavelength at 1480 nm is known to result in relatively high conversion efficiency—ideal for power boosting applications. Thus, the combination of pump wavelengths can provide a hybrid optical amplifier with a relatively low amplified spontaneous emission (ASE) in combination with a high conversion efficiency.

One issue that must be addressed when employing both a fiber amplifier stage and waveguide amplifier stage is the different gain spectra that may be produced by the gain media in which the rare-earth or other active element is located. In general the overall gain spectrum of the hybrid amplifier is the sum of the gain spectra of the individual stages. In some cases it may be desirable to employ different amplifier stages with different gain spectra. For example, by appropriate selection of the different individual gain spectra, the overall gain spectrum can be tailored to achieve, for example, a flat gain spectrum and/or a gain spectrum that has an increased bandwidth. However, since the gain media for the fiber amplifier stage and the waveguide amplifier stage are not necessarily the same, a substantial complication in the design and operation of the hybrid amplifier can arise in those cases where it is desirable for both stages to have substantially the same gain spectra. When all the stages contain identical gain media, gain can be shifted from one stage to another without affecting the overall gain spectrum provided that the total gain is maintained. However, if different stages contain different gain media, a shift in the gain from one stage to another will affect the overall gain spectrum because of the different gain spectra of the different stages. Accordingly, when different gain media are employed, the operating point of each stage needs to be tightly controlled so that the gain of each stage does not fluctuate by an undue amount. For this reason it will often be advantageous to select gain media for both the fiber amplifier stage and the waveguide amplifier stage that have well-matched gain spectra.

Although various embodiments are specifically illustrated and described herein, it will be appreciated that modifications and variations of the present invention are covered by the above teachings and are within the purview of the appended claims without departing from the spirit and intended scope of the invention. For example, while the hybrid optical amplifier has been described in terms of a multistage amplifier in which one stage is a planar waveguide amplifier and another stage is a rare-earth doped fiber amplifier, the present invention encompasses hybrid optical amplifiers that combine a planar waveguide amplifier with other types of fiber-based optical amplifiers. For example, instead of a rare-earth doped fiber amplifier, one or more of the stages may be formed from a Raman amplifier, which generates Raman gain in a fiber through which the signal passes.

What is claimed is:

1. A multistage optical amplifier comprising:
   a fiber amplifier stage that includes an active optical fiber for imparting gain to an optical signal propagating therethrough and a coupler supplying pump energy to the optical fiber; and
   a planar waveguide amplifier stage optically coupled to the fiber amplifier stage, said waveguide amplifier including a substrate, an active planar waveguide formed on the substrate for imparting gain to an optical signal propagating therethrough, and at least one waveguide coupler formed on the substrate for coupling pump power to the active planar waveguide;
   a second fiber amplifier stage that includes a second active optical fiber for imparting gain to an optical signal propagating therethrough and a second coupler supplying pump energy to the optical fiber.

2. The multistage optical amplifier of claim 1 wherein said fiber amplifier stage has an output coupled to an input of the planar waveguide amplifier stage and said waveguide amplifier stage has an output coupled to an input of the second fiber amplifier stage.

3. The multistage optical amplifier of claim 2 wherein said fiber amplifier stage is a rare-earth amplifier stage and said active optical fiber is doped with a rare-earth element.

4. The multistage optical amplifier of claim 3 wherein said rare-earth element is erbium.

5. The multistage optical amplifier of claim 3 wherein said second fiber amplifier stage is a rare-earth amplifier stage and said second active optical fiber is doped with a rare-earth element.

6. The multistage optical amplifier of claim 5 wherein said rare-earth element is erbium.

7. The multistage optical amplifier of claim 1 further comprising at least one passive optical element formed on said substrate on which said planar waveguide is formed.

8. The multistage optical amplifier of claim 7 wherein said passive optical element is selected from the group consisting of an optical isolator, a wavelength division multiplexer, an optical tap, a variable optical attenuator, and a gain flattening filter.

9. The multistage optical amplifier of claim 1 wherein said active planar waveguide is a multi-component glass waveguide.

10. The multistage optical amplifier of claim 9 wherein said multi-component glass waveguide is a rare-earth doped glass waveguide.

11. The multistage optical amplifier of claim 10 wherein said rare-earth doped glass waveguide is a rare-earth doped silica glass waveguide.

12. The multistage optical amplifier of claim 1 further comprising at least one pump source formed on said substrate on which said planar waveguide is formed and optically coupled to the waveguide coupler for supplying pump power to the active waveguide.

13. The multistage optical amplifier of claim 1 wherein said coupler and said waveguide coupler are adapted to couple pump energy at a common wavelength.

14. The multistage optical amplifier of claim 1 wherein said coupler and said waveguide coupler are adapted to couple pump energy at different wavelengths.

15. The multistage optical amplifier of claim 6 wherein said coupler and said waveguide coupler are adapted to couple pump energy at different wavelengths.

16. The multistage optical amplifier of claim 15 wherein said different pump wavelengths include wavelengths of 980 and 1440 nm.

17. The multistage optical amplifier of claim 1 wherein said active optical fiber and said active planar waveguide have gain media that exhibit substantially the same gain spectra.

18. The multistage optical amplifier of claim 1 wherein said active optical fiber and said active planar waveguide have gain media that exhibit substantially different gain spectra.

19. The multistage optical amplifier of claim 1 wherein said active optical fiber and said active planar waveguide have gain media that exhibit substantially different gain spectra to achieve an overall gain spectra having at least one prescribed characteristic.

20. The multistage optical amplifier of claim 19 wherein said prescribed characteristic includes a flatter gain spectrum than the individual gain spectra of the active optical fiber and the active planar waveguide.

21. The multistage optical amplifier of claim 19 wherein said prescribed characteristic includes a bandwidth that is greater than the bandwidth of the active optical fiber and the active planer waveguide.

22. The multistage optical amplifier of claim 1 wherein said fiber amplifier stage is a Raman amplifier stage.

23. A multistage optical amplifier comprising:
a fiber amplifier stage that includes an active optical fiber for imparting gain to an optical signal propagating therethrough and a coupler supplying pump energy to the optical fiber; and
a planar waveguide amplifier stage optically coupled to the fiber amplifier stage in a serial maimer such that substantially all of the optical signal provided at an output of the fiber amplifier stage is received at an input of the planar waveguide amplifier stage, said planar waveguide amplifier stage including a substrate, an active planar waveguide formed on the substrate for imparting gain to an optical signal propagating therethrough, and at least one waveguide coupler formed on the substrate for coupling pump power to the active planar waveguide.

24. The multistage optical amplifier of claim 23 further comprising a second fiber amplifier stage that includes a second active optical fiber for imparting gain to an optical signal propagating therethrough and a second coupler supplying pump energy to the optical fiber.

25. The multistage optical amplifier of claim 24 wherein said fiber amplifier stage has an output coupled to an input of the planar waveguide amplifier stage and said waveguide amplifier stage has an output coupled to an input of the second fiber amplifier stage.

26. The multistage optical amplifier of claim 25 wherein said fiber amplifier stage is a rare-earth amplifier stage and said active optical fiber is doped with a rare-earth element.

27. The multistage optical amplifier of claim 26 wherein said rare-earth element is erbium.

28. The multistage optical amplifier of claim 26 wherein said second fiber amplifier stage is a rare-earth amplifier stage and said second active optical fiber is doped with a rare-earth element.

29. The multistage optical amplifier of claim 28 wherein said rare-earth element is erbium.

30. The multistage optical amplifier of claim 23 further comprising at least one passive optical element formed on said substrate on which said planar waveguide is formed.

31. The multistage optical amplifier of claim 30 wherein said passive optical element is selected from the group consisting of an optical isolator, a wavelength division multiplexer, an optical tap, a variable optical attenuator, and a gain flattening filter.

32. The multistage optical amplifier of claim 23 wherein said active planar waveguide is a multi-component glass waveguide.

33. The multistage optical amplifier at claim 32 wherein said multi-component glass waveguide is a rare-earth doped glass waveguide.

34. The multistage optical amplifier of claim 33 wherein said rare-earth doped glass waveguide is a rare-earth doped silica glass waveguide.

35. The multistage optical amplifier of claim 23 further comprising at least one pump source formed on said substrate on which said planar waveguide is formed and optically coupled to the waveguide coupler for supplying pump power to the active waveguide.

36. The multistage optical amplifier of claim 23 wherein said coupler and said waveguide coupler are adapted to couple pump energy at a common wavelength.

37. The multistage optical amplifier of claim 23 wherein said coupler and said waveguide coupler are adapted to couple pump energy at different wavelengths.

38. The multistage optical amplifier of claim 29 wherein said coupler and said waveguide coupler are adapted to couple pump energy at different wavelengths.

39. The multistage optical amplifier of claim 38 wherein said different pump wavelengths include wavelengths of 980 and 1440 nm.

40. The multistage optical amplifier of claim 23 wherein said active optical fiber and said active planar waveguide have gain media that exhibit substantially the same gain spectra.

41. The multistage optical amplifier of claim 23 wherein said active optical fiber and said active planar waveguide have gain media that exhibit substantially different gain spectra.

42. The multistage optical amplifier of claim 23 wherein said active optical fiber and said active planar waveguide have gain media that exhibit substantially different gain spectra to achieve an overall gain spectra having at least one prescribed characteristic.

43. The multistage optical amplifier of claim 42 wherein said prescribed characteristic include, a flatter gain spectrum than the individual gain spectra of the active optical fiber and the active planar waveguide.

44. The multistage optical amplifier of claim 42 wherein said prescribed characteristic includes a bandwidth that is greater than the bandwidth of the active optical fiber and the active planar waveguide.

45. The multistage optical amplifier of claim 23 wherein said fiber amplifier stage is a Raman amplifier stage.

* * * * *

UNITED STATES PATENT AND TRADEMARK OFFICE
CERTIFICATE OF CORRECTION

PATENT NO. : 6,865,018 B2  Page 1 of 1
APPLICATION NO. : 10/280641
DATED : March 8, 2005
INVENTOR(S) : Sergey Frolov et al.

It is certified that error appears in the above-identified patent and that said Letters Patent is hereby corrected as shown below:

Col. 9, line 26, after "serial," change "maimer" to -- manner --.

Col. 10, line 47, after "characteristic," change "include," to -- includes --.

Signed and Sealed this

Third Day of June, 2008

JON W. DUDAS
*Director of the United States Patent and Trademark Office*